Patented May 20, 1924.

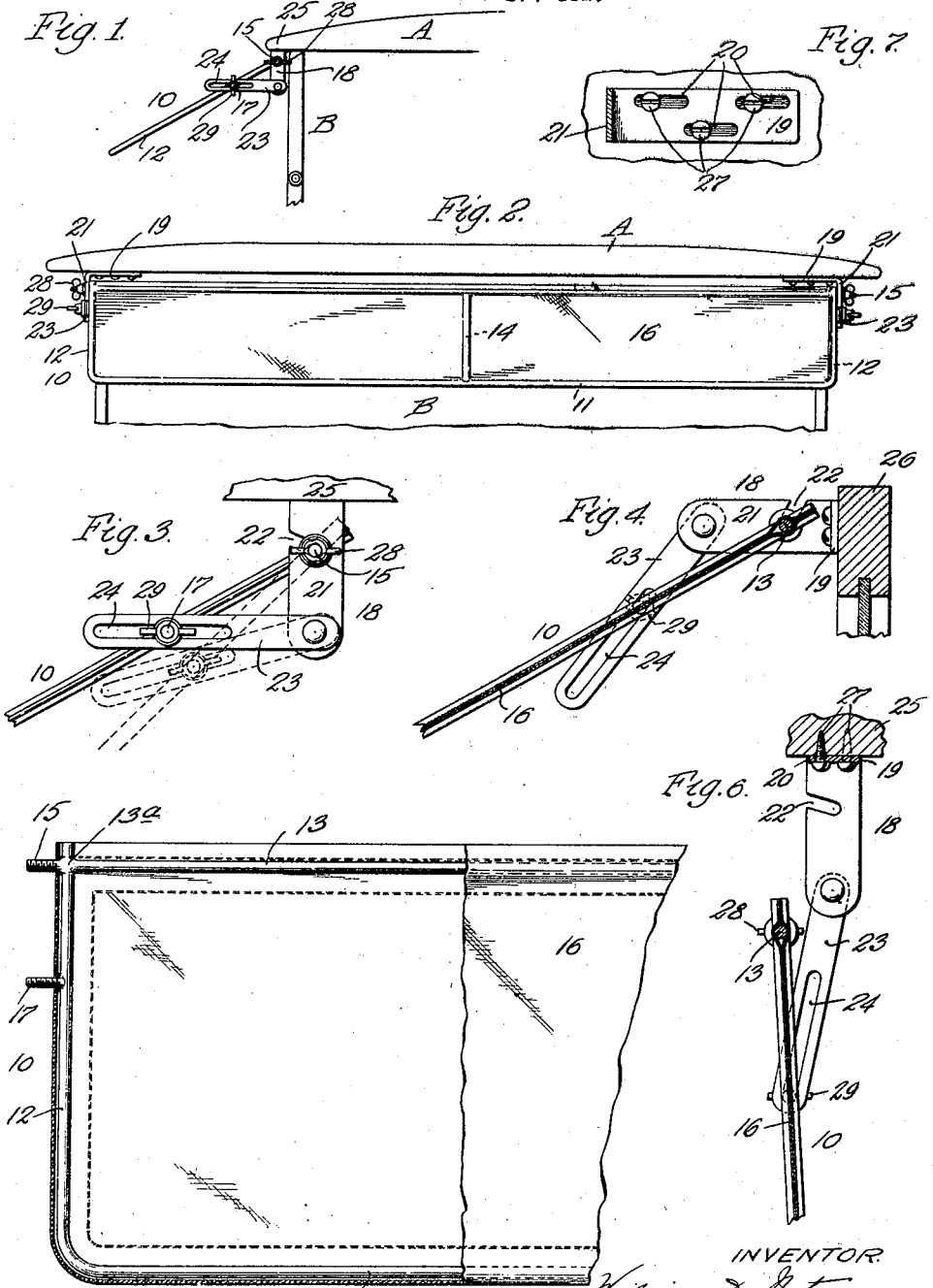

1,494,863

UNITED STATES PATENT OFFICE.

WILLIAM D. NOTMAN, OF BUFFALO, NEW YORK, ASSIGNOR TO McKINNON DASH COMPANY, OF BUFFALO, NEW YORK.

VEHICLE VISOR.

Application filed November 17, 1920. Serial No. 424,599.

*To all whom it may concern:*

Be it known that I, WILLIAM D. NOTMAN, a citizen of the United States, residing at Buffalo, in the county of Erie and State of New York, have invented a new and useful Improvement in Vehicle Visors, of which the following is a specification.

This invention relates to visors or sun and rain shields for vehicles. The invention is particularly adapted for use in front of the windshield of an automobile to provide a shield to protect the eyes of the operator.

The objects of the invention are to provide a visor of the type set forth which is readily attachable to horizontal, vertical or angular supporting surfaces; also which is readily attachable to the bows of the top of a vehicle or to parts of a permanent vehicle body; also to provide a visor of relatively light but rigid and strong construction.

Further objects are to provide improved visor supporting and adjusting means which permit of ready attachment of the visor to a vehicle and which permit adjustment and movement of the visor throughout a large angle; also to provide improved attaching means which effectively support and brace the visor in its adjusted positions; also to provide improved visor attaching means which may be quickly and easily connected to a vehicle and which facilitate ready attachment and removal of the visor from the vehicle and the attaching means. Still further objects are to provide improvements in vehicle visors and in attaching means therefor in the other respects hereinafter described and claimed.

In the accompanying drawings:—

Fig. 1 is a side elevation of a visor or sun shield and supporting and adjusting means therefor, constructed in accordance with this invention, showing the same secured to the lower horizontal face of the front bow of a motor vehicle.

Fig. 2 is a front elevation thereof.

Fig. 3 is a side elevation on an enlarged scale of the supporting and adjusting means for the visor, showing in full and broken lines two different positions thereof.

Fig. 4 is an inside face view thereof, with the supporting means secured to a vertical surface, and showing a portion of the visor in section.

Fig. 5 is a fragmentary sectional plan view of the visor.

Fig. 6 is a sectional elevation of the visor and its supporting means showing the relation of the parts when attaching the supporting bracket to the vehicle.

Fig. 7 is a sectional elevation of the supporting bracket secured on a supporting surface.

According to the invention the visor consists generally of a suitable opaque shield or visor member provided with projecting side studs or pivots which are held in supporting brackets adapted to be attached to a part of a vehicle and means for adjusting and holding the visor in different angular positions in front of the windshield of the vehicle.

A designates an automobile top and B a portion of a windshield of usual and well known type. In the preferred embodiment shown, the visor 10 comprises a frame consisting of a longitudinal wire or rod 11 which is bent upwardly at its ends so as to form the end members 12. The upper ends of the end members 12 are joined by a suitable upper longitudinal wire or rod 13 which is preferably lap-welded to the end members as at 13$^a$, so as to form a rigid and neat joint. If desired, the longitudinal members may be connected between their ends by a suitable transverse wire or rod 14, preferably welded to the two longitudinal members. In the preferred form illustrated, the ends of the upper longitudinal rod 13 project out a distance beyond the end rods 12 of the frame in the form of threaded studs or trunnions 15. The frame may be covered with fabric, leather, or other suitable material as indicated at 16. It is obvious that the visor may be of any other suitable construction if desired, the skeleton frame just above described being preferred at this time by reason of its many desirable qualities. 17 designates a pair of threaded studs or trunnions, one projecting from each of the end rods between its ends and spaced from the threaded stud 15, the studs 17 being welded or otherwise secured to the rods 12.

18 designates an attaching bracket by means of which the visor is secured to the vehicle. A pair of these attaching brackets is provided, one being adapted to support one end of the visor and each bracket comprises an attaching portion 19 preferably provided with staggered, elongated, screw-receiving slots 20 and an arm portion 21 preferably disposed at an angle to the portion 19. The arm portion 21 is provided with a recess 22 in which one of the studs 15 of the visor frame is adapted to bear. It is preferred that the recess 22 extend obliquely inwardly and downwardly relatively to the side edge of the arm portion 21 so that when the bracket is attached to a part of the vehicle, the studs 15 will turn in the lower parts of the recesses 22 and by reason of the inclination of the recesses, tend to remain therein, as shown in Figs. 1, 3 and 4 of the drawings. 23 designates slotted links which are pivoted to the arms 21, the slotted portions 24 being adapted to cooperate with the studs 17 to brace and assist in supporting the shield.

The bracket portion may be readily attached to a top bow 25 of a vehicle, as shown in Figs. 1, 2 and 3, or to a part of the front body sash or frame 26, as shown in Fig. 4, by means of screws 27 which extend through the slots 20 in the bracket portion 19. The visor may be swung upon its bearing in the recessed portion 22 of the arm 21 to any suitable position and for the purpose of securing the visor to the bracket and of securing the visor in its various adjusted positions, the threaded studs 15 and 17 are provided with suitable wing nuts 28 and 29 respectively. The slotted link 23 which bears upon the stud 17 effectively braces the visor in any of its adjusted positions as shown in Fig. 3 of the drawings, where in the position indicated, the bracket arm and link form a truss-like support for the visor.

The visor may be readily attached to any type of vehicle by connecting the brackets to a part of the vehicle in their approximate proper positions, depending upon the width of the visor, by means of the screws 27, the screws not being fully tightened. The visor may then be placed in the brackets by springing the link members apart and inserting the studs 17 in the slots of the links, and the studs 15 in the recesses of the arms 21. The wing nuts are then threaded on the studs which operation automatically acts to properly position the brackets on the part of the vehicle to which they are attached, the slotted attaching portions 19 of the brackets moving on the supporting surface relatively to the attaching screws 27 until proper position is reached. One or more of the attaching screws of each of the brackets may then be tightened, which effectively secures the brackets in their proper positions, the wing nuts may then be partially unscrewed from the studs 15, which permits the studs to be moved out of the recesses 22, whereupon the visor will pivot on the studs 17 and swing down and away from the attaching portions of the brackets as shown in Fig. 6. The other screws 27 for the attaching portions are then accessible and may be tightened, thereby effectively securing the attaching portions in their permanent positions. The studs 15 are then moved back into position in the recesses 22 of the arms of the brackets, the wing nuts screwed on the studs and the visor is ready for adjustment. Any desired position of the visor may be obtained simply by partially unscrewing the wing nuts 28 and 29, whereupon the visor may be moved to the desired position, where it will be maintained when the wing nuts are again tightened. The visor may be readily removed from the vehicle without removing the attaching brackets by unscrewing the wing nuts, removing the studs 15 from the recessed arms, and by springing the slotted links outwardly to release them from the studs 17. The attaching brackets occupy comparatively little space beneath the vehicle top and need not be removed when the visor is detached, and the visor may be readily attached to or detached therefrom as desired.

It will be seen that the brackets described can be utilized for supporting the visor from any desired supporting surface, whether the same is vertical, horizontal or inclined.

I claim as my invention:

1. In a visor or sun shield for attachment to automobiles and the like, the combination of a visor or shield having a pair of studs projecting from each end edge thereof, brackets adapted to be attached to a part of an automobile, said brackets each having an attaching portion provided with elongated screw-receiving slots and an arm portion provided with a downwardly extending span recess adapted to receive one of said studs, means for detachably clamping said stud in different angular positions in said recessed arm, and a brace member connected to said arm and bearing upon the other stud on said visor end.

2. In a visor or sun shield for attachment to automobiles and the like, the combination of a visor or shield having a pair of studs projecting from each end edge thereof, brackets adapted to be attached to a part of an automobile, said brackets each having an attaching portion provided with elongated screw-receiving slots and an arm portion provided with a downwardly extending recess adapted to receive one of said studs, means for detachably clamping said stud in different angular positions in said recessed arm, a slotted link pivoted to said recessed arm, the slotted portion of said link being adapted to take over the other stud on said visor end, whereby said slotted link may slide on said stud, and means for detachably clamping said last named stud to said slotted link.

WILLIAM D. NOTMAN.